(No Model.)
B. TYSON.
COMBINED AMALGAMATOR AND CONCENTRATOR.
No. 344,797. Patented June 29, 1886.
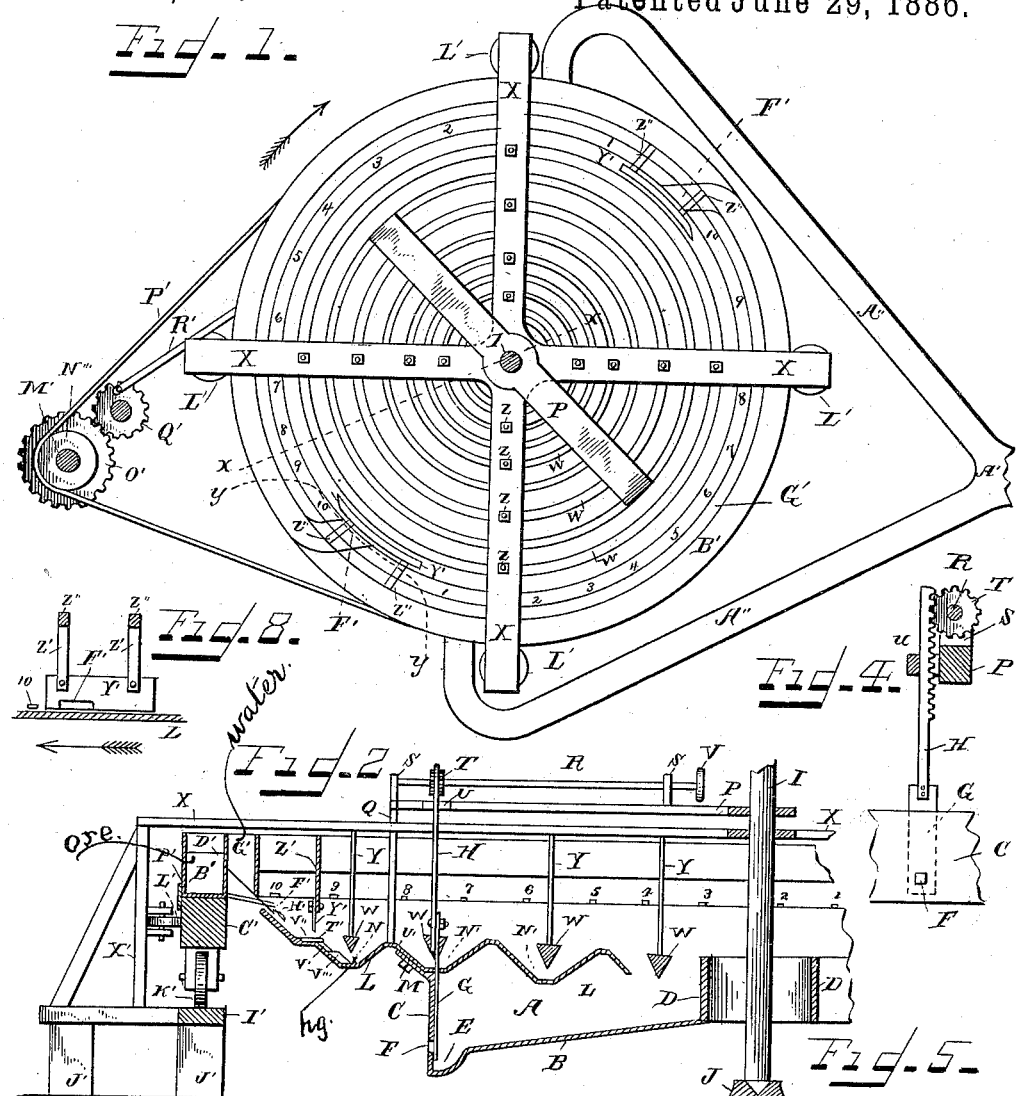
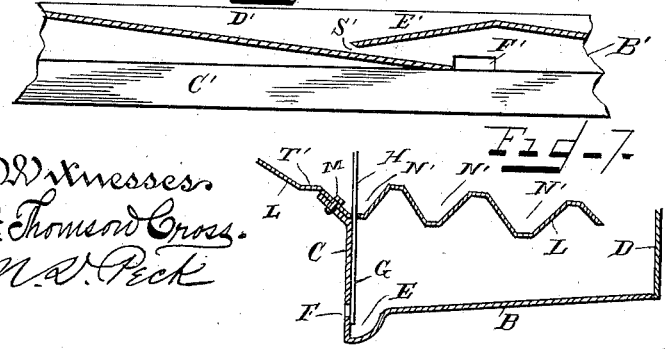
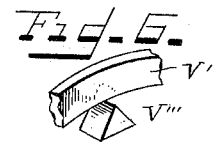
Witnesses.
J. Thomson Cross.
M. D. Peck
Inventor.
Bryan Tyson

UNITED STATES PATENT OFFICE.

BRYAN TYSON, OF WASHINGTON, DISTRICT OF COLUMBIA.

COMBINED AMALGAMATOR AND CONCENTRATOR.

SPECIFICATION forming part of Letters Patent No. 344,797, dated June 29, 1886.

Application filed March 3, 1886. Serial No. 193,858. (No model.)

*To all whom it may concern:*

Be it known that I, BRYAN TYSON, of the city of Washington, District of Columbia, have invented certain Improvements in a Combined Amalgamator and Concentrator for the More Effectual and Economical Working of Gold, Silver, and other Ores, of which the following is a specification.

The objects sought to be attained by my improvements are, first, in improvements in the construction of an apparatus for amalgamating the precious metals, whereby a much larger percentage can be amalgamated than is usually done; second, in improvements in the construction of an apparatus for concentrating ores that will vastly increase the capacity and practicability of the same over the devices ordinarily used for the same purpose.

In order to accomplish said purposes more economically and practically, I first employ my auxiliary device for throwing into the waste a large percentage of the valueless portion of the pulp. Said device was patented October 20, 1885, No. 328,546, and therefore no claims pertaining to same are made in this application.

My invention will be fully understood from the following description, reference being had to the accompanying drawings, in which—

Figure 1 is a plan view of my apparatus. Fig. 2 is a sectional view of same on line $x\ x$. Fig. 3 is a side view of the annular chamber B' of Fig. 1, with the outer wall removed. Fig. 4 is an enlarged side view of certain parts of Figs. 1 and 2 with parts removed. Fig. 5 is an enlarged plan view of certain parts of Fig. 1 with parts removed. Fig. 6 is a perspective view of certain parts of Fig. 2. Fig. 7 is a modification of certain parts of Fig. 2. Fig. 8 is a sectional view on line $y\ y$ of Fig. 1.

In the construction of my combined amalgamator and concentrator a circular pan, A, constructed of any proper material, is employed. C is the outer wall and D the inner wall of the same. The bottom B is preferably constructed on an incline, being lowest at the periphery. Said pan is provided with an annular chamber, E, and the outer wall of said chamber (being a continuation of the wall C) is provided with an aperture, F, Figs. 2, 4, and 7, for discharging concentrations. Said aperture is preferably constructed a suitable distance above the bottom of the chamber. The heavier particles, as well as any amalgam and quicksilver that may come into the pan, will thus rest at ease on the bottom of same, not being discharged with the concentrations. Said substances can be discharged as occasion may require from an aperature in the bottom of said chamber that is to be kept tightly closed when the pan is in operation.

G, Fig. 4, is a gate preferably constructed of a thin metallic plate. It is placed on the inside of the outer wall of the pan, and works over the aperture F, being kept in position by guides, or any other appropriate method. H is a toothed bar properly secured at the lower end to said gate.

The pan is properly secured to a vertical shaft, I, which is provided with suitable bearings—one at the foot, the other one a suitable distance above the pan.

L, Figs. 2 and 7, is an annular corrugated plate, preferably constructed on a proper incline, the inner edge being lowest. Said plate is secured to the pan by bolts M or by any other convenient mode of fastening. Said plate is provided with an annular groove, N, and a suitable number of other annular grooves, N', the latter being provided with slots N''.

The annular groove N, Fig. 2, is a proper receptacle for holding and working quicksilver. The quicksilver thus employed is also an important auxiliary in the concentration of ores, as will be hereinafter more fully explained.

T', Figs. 2 and 7, is a projection in the outer wall of the groove N, and is of such construction as to cause a suitable deflection of jets of water, from one to ten, inclusive, or of any other convenient number. By means of said deflection the valueless portion of the pulp will be removed a proper distance from the periphery of the plate L to form a suitable receptacle for the inflowing pulp, as will be more fully explained.

V', Figs. 2 and 6, is an annular plate constructed of any metal suitable for amalgamating purposes, and is properly secured to the outer wall of the annular groove N, the upper edge thereof preferably coming flush with the upper surface of the projection T'. V" is another amalgamating-plate, preferably placed on the upper surface of the projection T' and properly secured thereto, the inner edge thereof preferably coming flush with the face of plate V'. Said plates may be constructed whole or in any convenient number of pieces, as may be found best in practice.

V''', Figs. 2 and 6, are triangular lugs, that are properly secured to the outer wall of the annular groove N. Said lugs should extend inwardly a suitable distance beyond the plane of the plate V'. The construction of these lugs should be such as to cause the quicksilver, with which said groove is supplied to a proper depth, to be thrown upward and outward to a sufficient extent to cause said plates to be constantly and well supplied with quicksilver. Any convenient number of said lugs may be employed.

Any convenient number of annular grooves N, provided with plates V' and V" and triangular lugs V''' may be employed, as may be found best in practice, or either one of said plates may be dispensed with, or the groove N, including the plates V' V" and the triangular lugs V''', may all be dispensed with, if found advantageous so to do. In this case the annular grooves N' only would be employed, Fig. 7. These grooves are all provided with slots N", Fig. 5, of proper dimensions, in the bottom of same, through which the heavier particles will work out into the pan A. Any convenient number of said annular grooves N' may be employed. If the annular groove N, with accompanying amalgamating devices, be dispensed with, the annular chamber E will become the amalgamator of the apparatus, and in that case it should be properly supplied with quicksilver.

P, Figs. 2 and 4, is a bar of proper dimensions, reaching across the pan, and is provided with an aperture, through which the shaft I passes. Said bar is supported at either end by standards Q, that are properly secured at their lower ends to the annular plate L.

R is a shaft working in bearings S S, that are properly secured to the bar P. One end of said shaft is provided with a cog-wheel, T, that meshes with the toothed bar H. The piece U is provided with a suitable aperture, through which said toothed bar works. Said piece is properly secured to the bar P, and serves as a guide for the bar H. The other end of the shaft R is provided with a wheel, V. Thus arranged, the gate G can be readily raised or lowered by turning the wheel V.

W W, Figs. 1 and 2, are rings suspended from the cross-bars X X by rods Y Y. Said cross-bars are supported by posts X', that may rest on any proper foundation. Said rings are adjustable by means of nuts Z Z, that are placed on the upper ends of said rods. Any desired grade can thus be formed by turning the nuts and raising or lowering the rings. Any one or all of said rings may be dispensed with, as may be found best in practice.

A', Fig. 1, is a sluice-box for delivering the pulp, and is preferably subdivided into two sluice-boxes, A" A", so as to deliver the pulp at two points. It may be subdivided into any convenient number of sluice-boxes, as may be found best in practice.

B' is an annular revolving chamber for receiving the pulp from the sluice-boxes A" A", and thence delivering it through the apertures F' F' on top of the annular plate L, Figs. 1, 2, and 3. Said chamber is preferably constructed in two sections, each section preferably being provided with three bottoms, Fig. 3. The bottom C' is annular, and therefore common to both sections. Said bottom is preferably constructed level and of sufficient width and thickness to afford the necessary strength. The other two, D' and E', are false bottoms, and are placed on proper inclines. Any convenient number of sections, each section being preferably provided with false bottoms, D' and E', may be employed, as may be found best in practice.

G' is another annular revolving chamber, the bottom of which is preferably constructed level horizontally, but on a proper incline laterally, the inner edge being lowest. Said chamber is properly secured to the outside of the inner wall of the annular chamber B'. As shown in the drawings, Figs. 1 and 2, said chamber is provided with two sets of apertures of ten each, for jets of water; but any suitable number of apertures may be employed, as may be found best in practice. These sets pair with and are operated in connection with the two sections of the annular chamber B', as will be hereinafter more fully explained; hence the number of sections into which the annular chamber B' is subdivided and the number of sets of apertures with which the annular chamber G' is provided must be equal. Said apertures are preferably gradually increased in size as the figures increase, 1 being the smallest and 10 the largest. Said annular chamber G' when in operation is to be supplied with a proper quantity of water by means of a sluice-box or any other convenient mode. The construction should be such that about three-fourths of the jets of water discharged from said apertures, commencing with 1, acting in combination with the oscillating motion of the annular plate L, will cause a precipitation of the heavier substances of value to the upper surface of the projection T' before the larger jets are brought into requisition. These latter jets should be of sufficient force to blow the valueless portion of the pulp a suitable distance inwardly from the periphery of said plate L, thus forming a suitable receptacle for the inflowing pulp.

Y' Y', Figs. 1, 2, and 8, are plates suspended from the horizontal bars Z" Z" by the bars Z' Z'. The other ends of said bars Z" Z" are properly secured to the top of the annular chamber G'. These plates thus become rotary, traveling with said chamber. The pulp is discharged from the openings F' F' immediately in front of said plates, and the jets of water from apertures 10 10 precede them, Fig. 8. The object sought to be attained by said plates is to prevent the immediate return of the valueless pulp that has been blown inwardly toward the place of discharge by said jets of water. The cavity in the pulp, formed as aforesaid, is thus preserved until the inflowing pulp can be deposited therein. After the substances of value have been precipitated from the pulp the residue in turn is blown toward the place of discharge and new pulp substituted therefor, and thus the work continues.

I', Fig. 2, is an annular railway preferably constructed level, and is supported by a suitable number of posts, J' J'. K' is a roller properly secured to the bottom C', and rests on said annular railway. A sufficient number of said rollers is employed to properly support the annular chambers B' and G'.

L', Figs. 1 and 2, are other rollers, that may be employed on the outside or inside of the annular chamber B'. In the drawings they are shown as working on the outside, and are properly secured to the posts X' X'. Four rollers, or any other convenient number of lugs, may be employed. The object of said rollers is to cause the annular chambers B' and G' to describe regular circles on the railway I'; otherwise the pulp would not be properly delivered on the annular plate L. Any other convenient mode may be employed in lieu of the rollers L'.

M', Fig. 1, is a vertical shaft that is provided with a pulley, N''', and a cog-wheel, O'. P', Figs. 1 and 2, is a belt that passes around said pulley and the annular chamber B'. The cog-wheel O' meshes with the crank-wheel Q', and the connecting-rod R' properly connects said crank-wheel and the pan A. Any other convenient mode of applying power may be employed.

The operation of my combined amalgamator and concentrator is as follows: The annular groove N having been properly supplied with quicksilver, power is applied to the shaft M', thus transmitting a slow rotary motion to the annular chambers B' G' and a proper oscillating motion to the pan A. The pulp is discharged from the sluice-boxes A'' A'' on the inclined bottoms D' D', and flows thence toward the outlets F' F', Fig. 3. When the bottoms E' E' pass under the mouths of the sluice-boxes A'' A'', they receive the pulp, causing same to flow in an opposite direction until it is dumped on the bottoms D' D', when it changes its course, flows through the openings S' S', and is finally discharged from the outlets F' F'. The object of employing the bottoms E' E' is to prevent boiling of the pulp near the places of discharge, and thus afford proper facilities for the heavier particles to settle to the bottoms of the sluices before they are delivered on top of the annular plate L. The combined action of the jets of water and plate L will cause a precipitation of the heavier substances of value to a place of safety, as already described. The upper surface of the projection T' may be regarded as such place of safety. Even if the larger jets strike said projection with a force sufficient to cause a considerable deflection of the water and pulp, the heavier substances that have been precipitated thereon will not be raised thereby, but will rather settle still lower after leaving said projection. The plates Y' Y', Fig. 8, will prevent the immediate return of the pulp that has been blown out by the jets from apertures 10 10, thus forming proper receptacles for receiving the inflowing pulp, as already described. The ridge U', intervening between the annular groove N and the first of the series N', is preferably constructed a suitable distance lower than the grade described by the residue of ridges between this point and the central discharge. The object of this arrangement is, that there shall at all times be a sufficient depth of pulp on top of said ridge U' to prevent the heavier particles, after they have once been precipitated, from again being subjected to risk. Said heavy particles will impinge on the ridge U' as they flow from the annular groove N to the first of the series N', from whence they will pass out through the slots N'', Fig. 5, into the pan. The rings W W will have the effect of giving the pulp overlying the annular grooves N and N' a peculiar agitation. Thus, the pulp that impinges on said rings will be oscillated but very little, while that more remote will be oscillated to a greater extent. This crawling motion of the pulp, the particles thereof passing by each other, has the effect of creating the necessary interstices into which the heavier particles are readily precipitated. The quicksilver deposited in the annular groove N will also exert a beneficial influence in the matter of concentration by causing the pulp overlying same to remain to a great extent stationary, while that on either side will receive the desired agitation, thus forming the necessary interstices, as already described. This property of the quicksilver may render the employment of a ring, W, unnecessary for the groove N; hence the quicksilver will perform an important office, independent of amalgamation. The lugs V'''', Figs. 2 and 6, in connection with the oscillating motion of the annular plate L, will raise and throw upward and outward a proper quantity of quicksilver to keep the annular plates V' and V''' well amalgamated. The grade formed by the rings W W should be such as to cause a ready flow of the water and pulp from the periphery toward the central discharge, thus preventing an inconvenient accumulation of valueless material. After the substances of value have been precipitated, the residue of the pulp will flow over the inner wall, D, of the pan into the waste. The construction here should be such as to prevent the water and pulp from coming in contact with the step J. By turning the wheel V and raising the gate G, the concentrations can be discharged through the aperture F, as occasion may require. The substances of value still remaining in the annular chamber E below the aperture F can, when necessary, be discharged from an aperture in the bottom of said chamber.

Having described my invention, what I claim as new, and desire to secure by Letters Patent, is—

1. Annular chambers B' and G', the first for distributing pulp, the latter for discharging jets of water, both operated by a pulley, N''', and a belt, P', in combination with a pan, A, that is provided with a central discharge, and an annular corrugated plate, L, said plate being provided with annular grooves N N', (the latter constructed with slots N'',) operated by the crank-wheel Q' and connecting-rod R', substantially as and for the purposes described.

2. The annular chambers B' G' and plate Y', suspended from the horizontal bars Z'' Z'' by the bars Z' Z', in combination with a pan, A, that is provided with a central discharge, an annular chamber, E, an aperture, F, for discharging the concentrations, and an annular corrugated plate, L, said plate being provided with a projection, T', and annular grooves N N', substantially as and for the purposes described.

3. The annular chambers B' G', the plate Y', and rings W W, suspended from the cross-bars X X by rods Y Y, in combination with a pan, A, that is provided with a central discharge, an annular chamber, E, an aperture, F, for discharging concentrations, and an annular corrugated plate, L, said plate being provided with a projection, T', annular grooves N N', amalgamating-plates V' V'', and triangular lugs V''', substantially as and for the purposes described.

4. The annular chambers B' G' and plate Y', in combination with a pan, A, that is provided with a central discharge, an annular chamber, E, an aperture, F, for discharging concentration, and an annular corrugated plate, L, said plate being provided with a projection, T', annular grooves N N', amalgamating-plates V' V'' and triangular lugs V''', substantially as and for the purposes described.

5. The annular chambers B' and G', in combination with a pan, A, that is provided with a central discharge, and an annular corrugated plate, L, said plate being provided with annular slotted grooves N', substantially as and for the purposes described.

6. The annular chambers B' G' and plate Y', in combination with a pan, A, that is provided with a central discharge, an annular chamber, E, an aperture, F, and an annular corrugated plate, L, said plate being provided with a projection, T', and annular grooves N', substantially as and for the purposes described.

7. The annular chambers B' and G', the plate Y', and rings W W', in combination with a pan, A, that is provided with a central discharge, an annular chamber, E, an aperture, F, and an annular corrugated plate, L, said plate being provided with annular grooves N', substantially as and for the purposes described.

8. The annular chambers B' and G', the plate Y', and rings W W, in combination with a pan, A, that is provided with a central discharge, an annular chamber, E, an aperture, F, and an annular corrugated plate, L, said plate being provided with a projection, T', and annular grooves N', substantially as and for the purposes described.

In testimony whereof I affix my signature in presence of two witnesses.

BRYAN TYSON.

Witnesses:
EMMA M. GILLETT,
JOHN G. KROHR.